United States Patent
Ho et al.

(10) Patent No.: US 7,460,295 B2
(45) Date of Patent: Dec. 2, 2008

(54) PERIODIC POLING STRUCTURE AND ELECTRODE ELEMENT AND METHOD FOR PREPARING THE SAME

(75) Inventors: Joseph Lung-Chang Ho, Hsinchu (TW); Tze-Chia Lin, Hsinchu (TW); Ming-Hsien Chou, Hsinchu (TW)

(73) Assignee: HC Photonics Corp., Hsinchu (TW)

( * ) Notice: Subject to any disclaimer, the term of this patent is extended or adjusted under 35 U.S.C. 154(b) by 166 days.

(21) Appl. No.: 11/465,681

(22) Filed: Aug. 18, 2006

(65) Prior Publication Data
US 2008/0044153 A1   Feb. 21, 2008

(51) Int. Cl.
G02F 1/35  (2006.01)

(52) U.S. Cl. .................. 359/326; 359/332; 430/317; 385/122

(58) Field of Classification Search ......... 359/326–332; 430/318, 317; 204/157.15, 164; 385/122
See application file for complete search history.

(56) References Cited

U.S. PATENT DOCUMENTS

| 5,756,263 A | * | 5/1998 | Gupta et al. | 430/317 |
|---|---|---|---|---|
| 5,875,053 A | * | 2/1999 | Webjorn et al. | 359/326 |
| 6,002,515 A | | 12/1999 | Mizuuchi et al. | |
| 6,353,495 B1 | | 3/2002 | Mizuuchi et al. | |
| 6,542,285 B1 | * | 4/2003 | Batchko et al. | 359/326 |
| 6,631,231 B2 | | 10/2003 | Mizuuchi et al. | |
| 6,836,354 B2 | | 12/2004 | Kato et al. | |

* cited by examiner

*Primary Examiner*—Hemang Sanghavi
(74) *Attorney, Agent, or Firm*—Connolly Bove Lodge & Hutz LLP (57) ABSTRACT

A periodic poling structure comprises a ferroelectric substrate including a plurality of tunnels, a plurality of first domains positioned in the ferroelectric substrate between the tunnels and a plurality of second domains interleaved between the first domains in the ferroelectric substrate. Each first domain has a first polarization direction, and each second domain has a second polarization direction different from the first polarization direction. The tunnels are disposed on a top surface and on a bottom surface of the ferroelectric substrate in an equal interval manner or in a variant interval manner. Particularly, the second polarization direction is opposite to the first polarization direction. The periodic poling structure further comprises a plurality of conductive blocks covering the entire base surfaces of the tunnels, or separated from the sidewalls of the tunnels by insulation gaps such that the conductive blocks cover only a portion of the base surfaces of the tunnels.

12 Claims, 8 Drawing Sheets

PERIODIC POLING STRUCTURE AND ELECTRODE ELEMENT AND METHOD FOR PREPARING THE SAME

BACKGROUND OF THE INVENTION (A) Field of the Invention

The present invention relates to a periodic poling structure and an electrode element and a method for preparing the same, and more particularly, to a periodic poling structure for quasi-phase matching (QPM) and an electrode element and a method for preparing the same.

(B) Description of the Related Art

The periodic poling structure, formed on a ferroelectric single crystal such as lithium niobate, may be widely used in the optical fields such as optical storage and optical measurement. There are several methods for preparing the periodic poling structure, such as proton-exchanging, the electron beam-scanning method and the electric voltage applying method, etc.

U.S. Pat. No. 6,002,515 discloses a method for manufacturing a polarization inversion part on a ferroelectric crystal substrate. The polarization inversion part is prepared by steps of applying a voltage in the polarization direction of the ferroelectric crystal substrate to form a polarization inversion part, conducting a heat treatment for reducing an internal electric field generated in the substrate by having applied the voltage, and then reinverting polarization in a part of the polarization inversion part by applying a reverse direction voltage against the voltage that was previously applied. In other words, the method for preparing a polarization inversion part disclosed in U.S. Pat. No. 6,002,515 requires performing the application of electric voltage twice.

U.S. Pat. No. 6,353,495 discloses a method for forming an optical waveguide element. The disclosed method forms a convex ridge portion having a concave portion on a ferroelectric single crystalline substrate, and a ferroelectric single crystalline film is then formed in the concave portion. A comb-shaped electrode and a uniform electrode are formed on a main surface of the ferroelectric single crystalline substrate, and electric voltage is applied to these two electrodes to form a ferroelectric domain-inverted structure in the film in the concave portion.

U.S. Pat. No. 6,836,354 discloses a method for producing an optical waveguide by irradiating a laser beam onto an oxide single crystal material. The laser beam is irradiated onto an oxide single crystal to form an optical waveguide portion defined by laser working faces, which are then subjected to a wet etching process using, for example, a strong alkaline solution.

U.S. Pat. No. 6,631,231 discloses a method for preparing an Optical waveguide element. A ridge-type optical waveguide is joined to a surface of a substrate via a joining layer made of an amorphous material. Two grooves are formed to shape an optical waveguide of a ridge type structure by using a dicing device or a laser-working device, and a machining-type dicing is preferred.

SUMMARY OF THE INVENTION

One aspect of the present invention provides a periodic poling structure comprising a ferroelectric substrate including a plurality of tunnels, a plurality of first domains positioned in the ferroelectric substrate between the tunnels and a plurality of second domains interleaved between the first domains in the ferroelectric substrate. Each first domain has a first polarization direction, and each second domain has a second polarization direction different from the first polarization direction. The tunnels may be disposed on a top surface and on a bottom surface of the ferroelectric substrate in an equal interval manner or in a variant interval manner. Particularly, the second polarization direction is substantially opposite to the first polarization direction. Preferably, the periodic poling structure further comprises a plurality of conductive blocks covering the entire base surfaces of the tunnels, or separated from the sidewalls of the tunnels by insulation gaps such that the conductive blocks covers only a portion of the base surfaces of the tunnels.

Another aspect of the present invention provides an electrode element comprising a first conductive body and a plurality of first conductive protrusions positioned on the first conductive body, wherein the first conductive protrusions are arranged in correspondence to a plurality of domains of a periodic poling structure. Particularly, the electrode element may further comprise a second conductive body and a plurality of second conductive protrusions positioned on the second conductive body, wherein the second conductive protrusions are arranged in mirror images of the first conductive protrusions. Preferably, the first conductive protrusions may be positioned on the first conductive body in an equal interval manner or in a variant interval manner.

A further aspect of the present invention provides a method for preparing a periodic poling structure, comprising the steps of forming a plurality of tunnels in a ferroelectric substrate, forming a plurality of conductive blocks in the tunnels and applying a predetermined voltage to the conductive blocks in the tunnels such that a plurality of first domains having a first polarization direction are formed in the ferroelectric substrate between the tunnels and a plurality of second domains interleaved between the first domains are formed in the ferroelectric substrate. The step of forming a plurality of conductive blocks in the tunnels may comprise depositing a conductive layer covering the ferroelectric substrate and the tunnels and removing a portion of the conductive layer from the ferroelectric substrate such that the conductive layer remaining in the tunnels forms the conductive blocks.

In addition, forming a plurality of conductive blocks in the tunnels may comprise the steps of forming a photoresist layer having a plurality of openings exposing a portion of the ferroelectric substrate, depositing a conductive layer covering the ferroelectric substrate and the photoresist layer and removing a portion of the conductive layer covering the photoresist layer such that the conductive layer covering the ferroelectric substrate forms the conductive blocks in the tunnels. Preferably, the openings in the photoresist layer are separated from the sidewalls of the tunnels by the photoresist layer such that the openings expose only a portion of the base surfaces of the tunnels.

An additional aspect of the present invention provides a method for preparing a periodic poling structure, comprising the step of applying a predetermined voltage to a ferroelectric substrate via an electrode element including a first conductive body and a plurality of first conductive protrusions positioned on the first conductive body such that a plurality of first domains having a first polarization direction are formed in the ferroelectric substrate between the first conductive protrusions and a plurality of second domains interleaved between the first domains are formed in the ferroelectric substrate. Preferably, the method may further comprise a step of forming a plurality of tunnels in the ferroelectric substrate, and the first conductive protrusions are positioned in the tunnels in the ferroelectric substrate. Further, the method may further comprise a step of forming a plurality of conductive blocks in the tunnels, and the first conductive protrusions are positioned to contact the conductive blocks in the tunnels.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
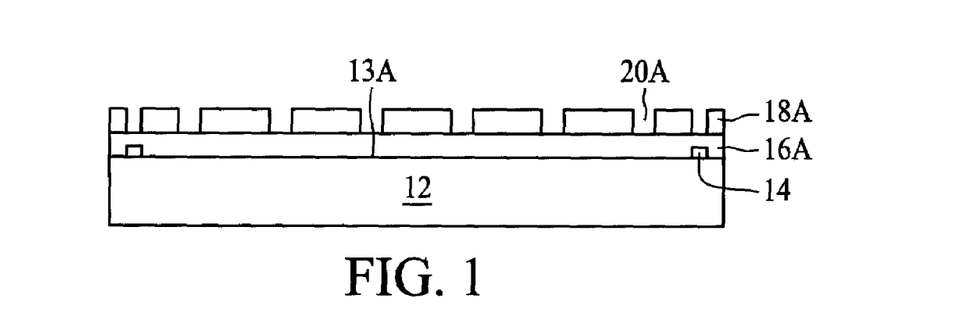
FIG. 1 to FIG. 9 illustrate a method for preparing a periodic poling structure according to a first embodiment of the present invention.
Figure 2:
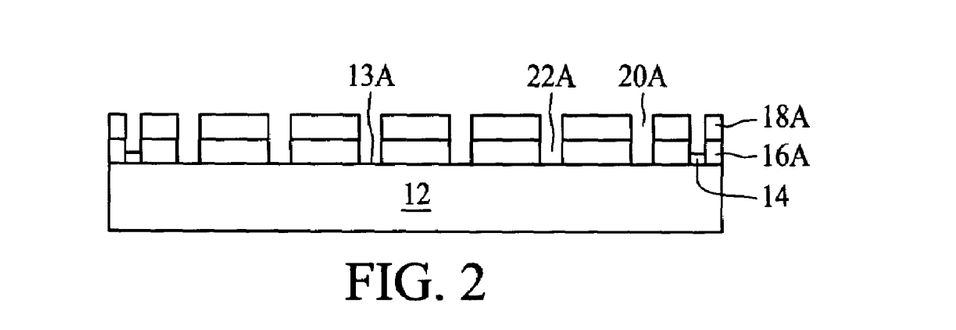

FIG. 1 to FIG. 9 illustrate a method for preparing a periodic poling structure 10 according to a first embodiment of the present invention. An oxide layer 16A is formed on a top surface 13A of a ferroelectric substrate 12 having alignment marks 14, and a photoresist layer 18A having a plurality of openings 20A is then formed on the oxide layer 16A. Subsequently, an etching process is performed using the photoresist layer as an etching mask to remove a portion of the oxide layer 16A not covered by the photoresist layer 18A, i.e., the portion of the oxide layer 16A under the openings 20A, to form a plurality of openings 22A in the oxide layer 16A, as shown in FIG. 2. For example, the etching process can be a wet etching process using a buffered oxide etchant such as buffered hydrofluoric acid.

Figure 3:
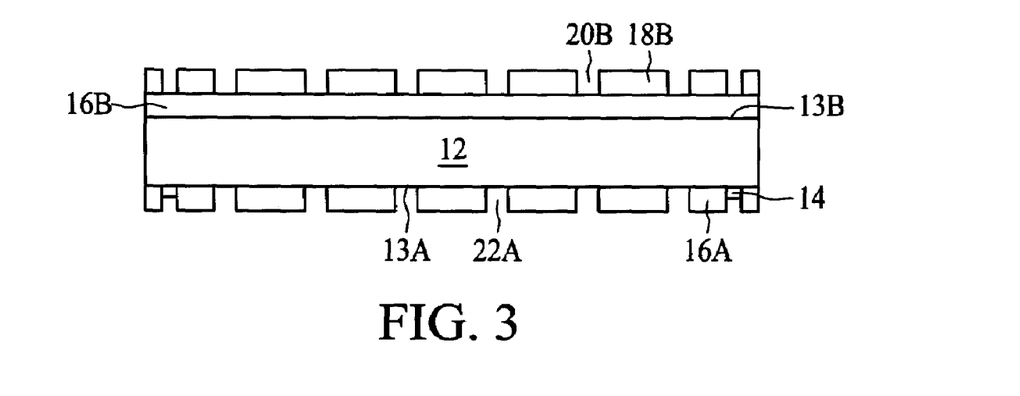
Figure 4:
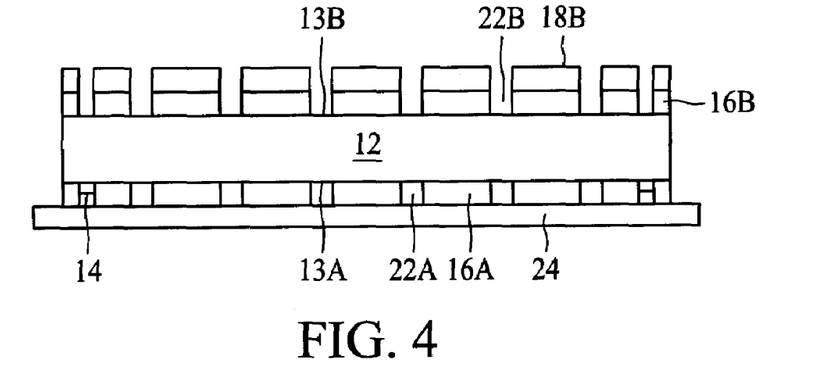

Referring to FIG. 3, which is upside down compared to FIG. 2, the photoresist layer 18A is removed from the surface of the oxide layer 16A by a lift-off process, an oxide layer 16B is formed on a bottom surface 13B of the ferroelectric substrate 12, and a photoresist layer 18B having a plurality of openings 20B is then formed on the oxide layer 16B with reference to the alignment marks 14 on the top surface 13A of the ferroelectric substrate 12 such that the openings 22A in the oxide layer 16A are aligned with the opening 20B in the photoresist layer 18B. Subsequently, an oxide etchant protective layer 24 is used to isolate the oxide layer 16A and the openings 22A from the environment, and an etching process is then performed to remove a portion of the oxide layer 16B using the photoresist layer 18B as an etching mask to form a plurality of openings 22B in the oxide layer 16B, as shown in FIG. 4.

Figure 5:
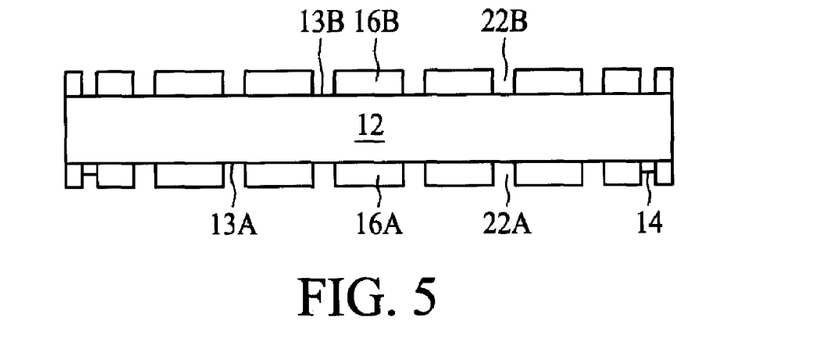
Figure 6:
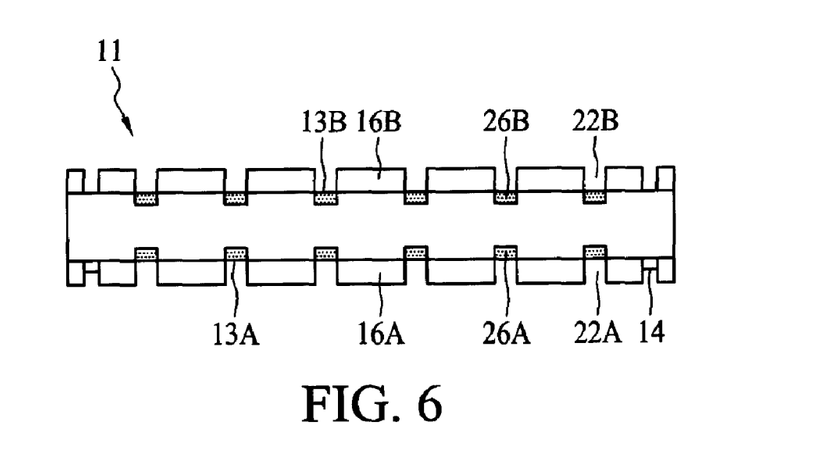

Referring to FIG. 5, the etchant protection layer 24 is removed from the oxide layer 16A and the photoresist layer 18B is removed from the oxide layer 16B by the lift-off process. The wafer 11 including the ferroelectric substrate 12 and the layers thereon are emerged in a proton-containing solution such as benzoic acid solution, such that protons in the proton-containing solution diffuse into the ferroelectric substrate 12 through the openings 22A in the oxide layer 16A and the openings 22B in the oxide layer 16B to form a plurality of diffusion regions 26A and 26B in the ferroelectric substrate 12, respectively, as shown in FIG. 6.

Figure 7:
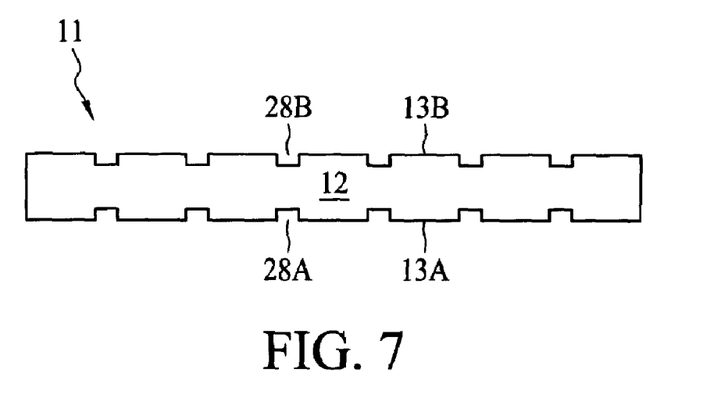
Figure 8:
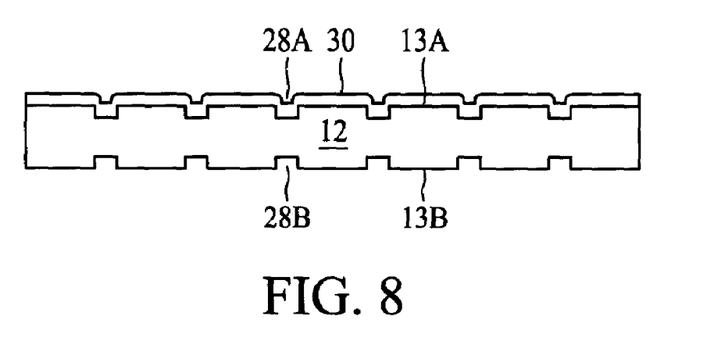

Referring to FIG. 7, the wafer 11 then undergoes an etching process. The etching method can be either dry etching or wet etching. For wet etching method, the wafer 11 is dipped in a buffered oxide etchant solution such as buffered hydrofluoric acid to perform a wet etching process such that the oxide layers 16A and 16B are entirely removed from the top surface 13A and the bottom surface 13B of the ferroelectric substrate 12, respectively. In addition, the buffered oxide etchant also selectively removes a portion of the ferroelectric substrate 12, i.e., the diffusion regions 26A on the top surface 13A and the diffusion regions 26B on the bottom surface 13B. Because the etching rate of the buffered oxide etchant to the diffusion regions 26A and 26B is higher than that of the ferroelectric substrate 12, a plurality of tunnels 28A and 28B are formed on the top surface 13A and on the bottom surface 13B of the ferroelectric substrate 12 in an equal interval manner, respectively. Subsequently, a conductive layer 30 covering the top surface 13A of the ferroelectric substrate 12 and the tunnels 28A is formed by a deposition process, as shown in FIG. 8. The conductive layer 30 can be made of conductive material such as nickel, chrome, or combinations thereof.

Figure 9:
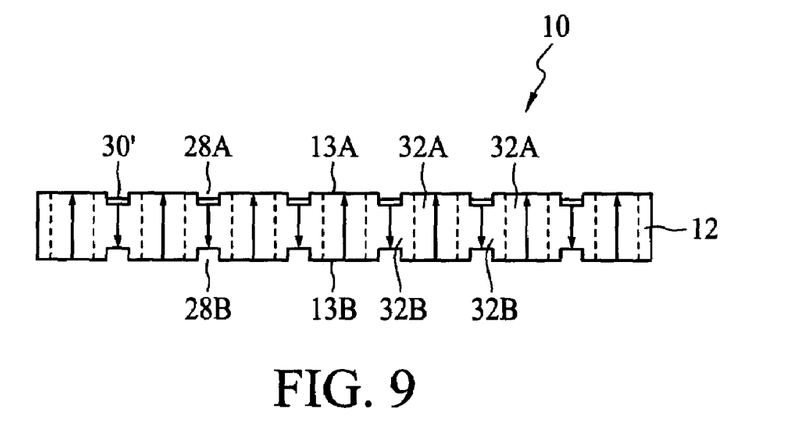
Figure 10:
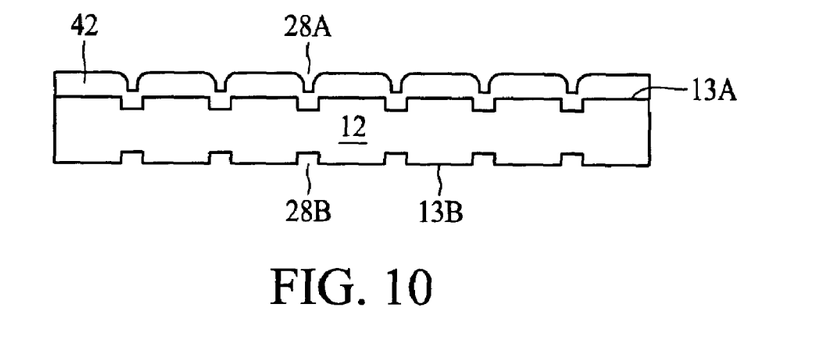
FIG. 10 to FIG. 14 illustrate a method for preparing a periodic poling structure according to a second embodiment of the present invention.

Referring to FIG. 9, a portion of the conductive layer 30 is removed from the top surface 13A of the ferroelectric substrate 12 by a polishing process, while the other portion of the conductive layer 30 remaining in the tunnels 28A forms a plurality of conductive blocks 30'. Subsequently, a predetermined voltage is applied to the conductive blocks 30' in the tunnels 28A and the tunnels 28B is grounded to complete the periodic poling structure 10. The periodic poling structure 10 comprises a plurality of first domains 32A having a first polarization direction in the ferroelectric substrate 12 between the tunnels 28A and a plurality of second domains 32B interleaved between the first domains 32A in the ferroelectric substrate 12, which can be used as a quasi-phase matching structure. The entire ferroelectric substrate 12 originally possesses a polarization direction the same as the first polarization, but the applied voltage partially inverts the polarization direction of the ferroelectric substrate 12. In particular, the second polarization direction is substantially opposite to the first polarization direction, and the conductive blocks 30' cover the base surfaces of the tunnels 28A entirely.

Figure 11:
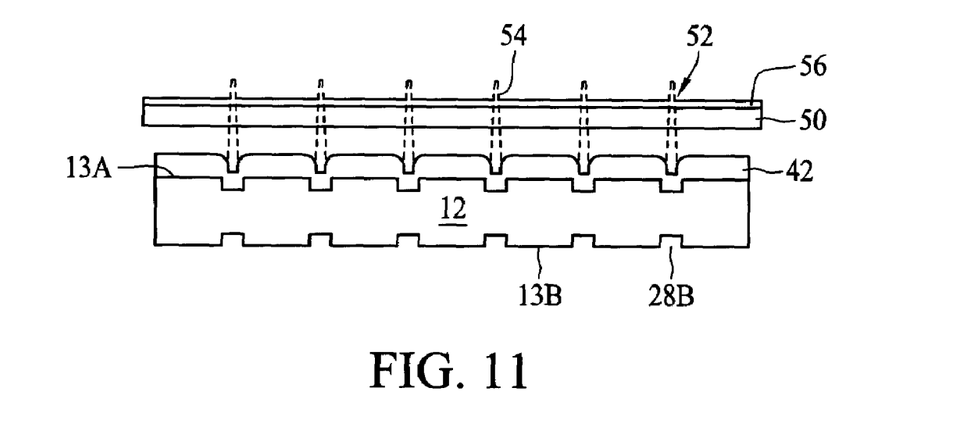

FIG. 10 to FIG. 14 illustrate a method for preparing a periodic poling structure 40 according to a second embodiment of the present invention. The processes shown in FIG. 1 to FIG. 7 are performed first, and a photoresist layer 42 covering the top surface 13A and the tunnels 28A is formed on the ferroelectric substrate 12. Subsequently, a lithographic process is performed using a mask 50 having an opaque masking layer 56 with a plurality of transparent openings 52 therein. The positions of the transparent openings 52 correspond to the tunnels 28A such that a portion of the photoresist layer 42 in the tunnels 28A is exposed by the exposing beams 54 transmitting the transparent regions 52, as shown in FIG. 11.

Figure 12:
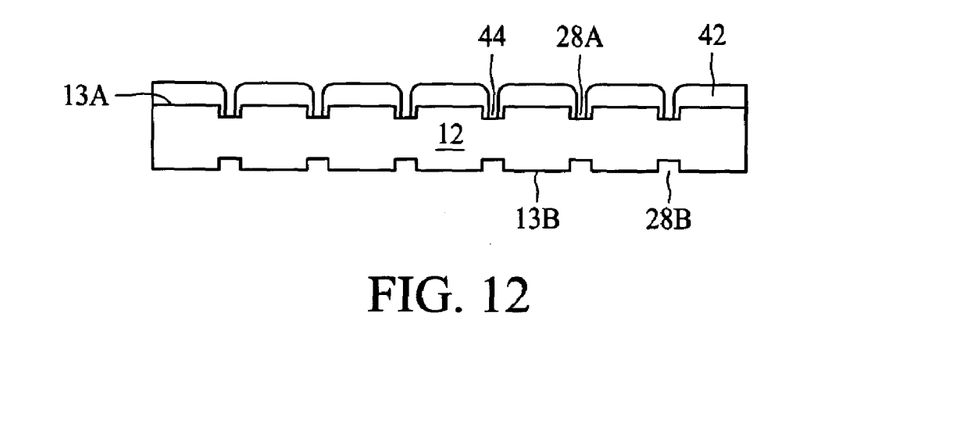
Figure 13:
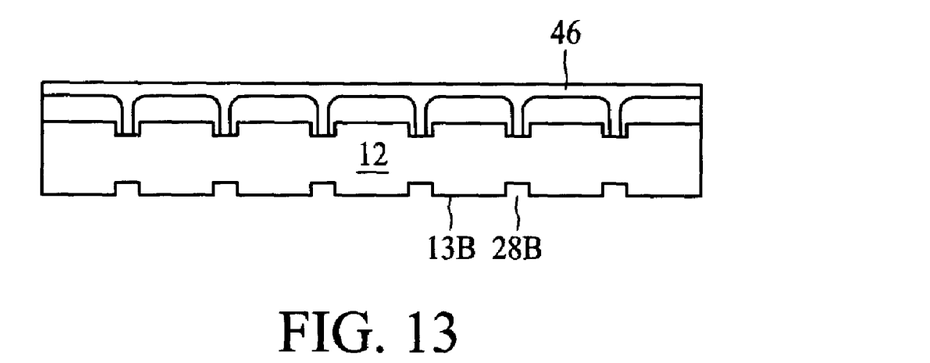

Referring to FIG. 12, since only a portion of the photoresist layer 42 in the tunnels 28A is exposed, a subsequent developing process can selectively remove the exposed portion of the photoresist layer 42 to form a plurality of openings 44 in the photoresist layer 42 in the tunnels 28A. Particularly, the openings 44 are separated from the sidewall of the tunnels 28A by the photoresist layer 42, and expose only a portion of the base surfaces of the tunnel 28A in the ferroelectric substrate 12. Subsequently, a conductive layer 46 covering the photoresist layer 42 and the tunnels 28A, i.e., filling the openings 44 in the photoresist layer 42, is formed by a deposition process, as shown in FIG. 13.

Figure 14:
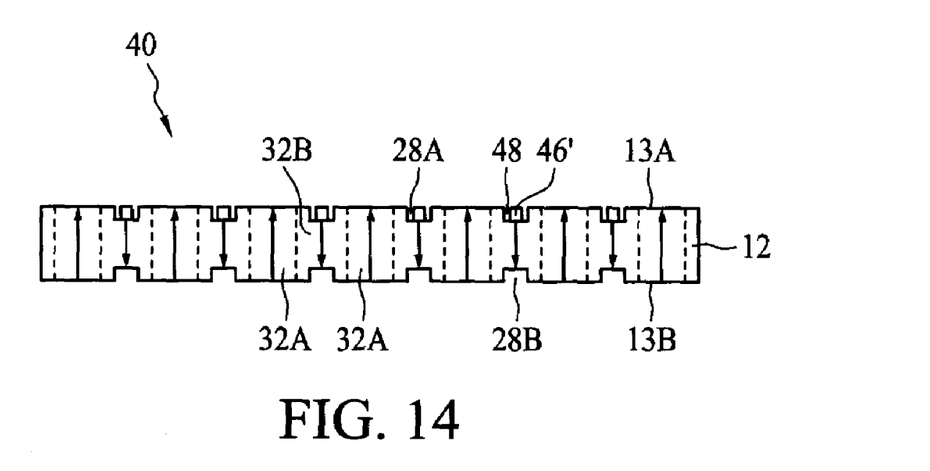

Referring to FIG. 14, a lift-off process is performed to remove the photoresist layer 42 and a portion of the conductive layer 46 on the photoresist layer 42, while the other portion of the conductive layer 46 remaining in the tunnels 28A forms a plurality of conductive blocks 46'. Subsequently, a predetermined voltage is applied to the conductive blocks 46' in the tunnels 28A and the bottom surface 13B is grounded to complete the periodic poling structure 40. The periodic poling structure 40 comprises a plurality of first domains 32A having a first polarization direction in the ferroelectric substrate 12 between the tunnels 28A and a plurality of second domains 32B interleaved between the first domains 32A in the ferroelectric substrate 12. In comparison with the periodic poling structure 10, shown in FIG. 9, in which the conductive blocks 30' cover the base surfaces of the tunnels 28A entirely, the periodic poling structure 40 in FIG. 14 has the conductive blocks 46' each separated from the sidewall of the tunnels 28A by insulation gaps 48 such as air gaps. Since there is no electric field extending from the sidewall of the conductive blocks 46' to that of the tunnels 28A, the method shown in FIG. 10 to FIG. 14 allows more precise control of the widths of the second domains 32B.

Figure 15:
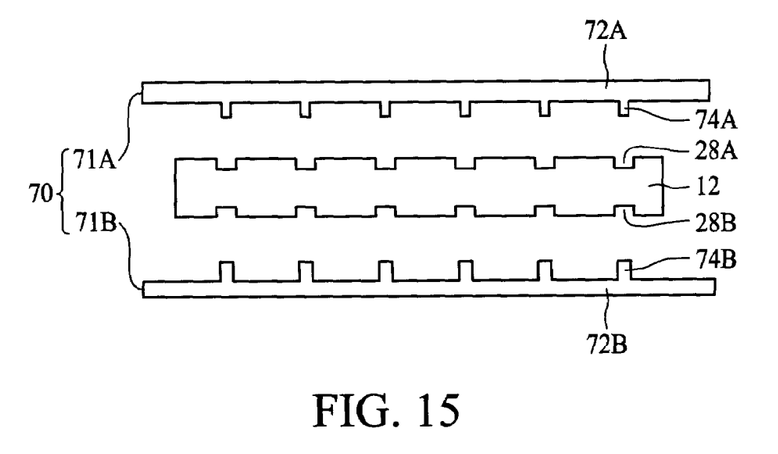
FIG. 15 and FIG. 16 illustrate a method for preparing a periodic poling structure according to a third embodiment of the present invention.
Figure 16:
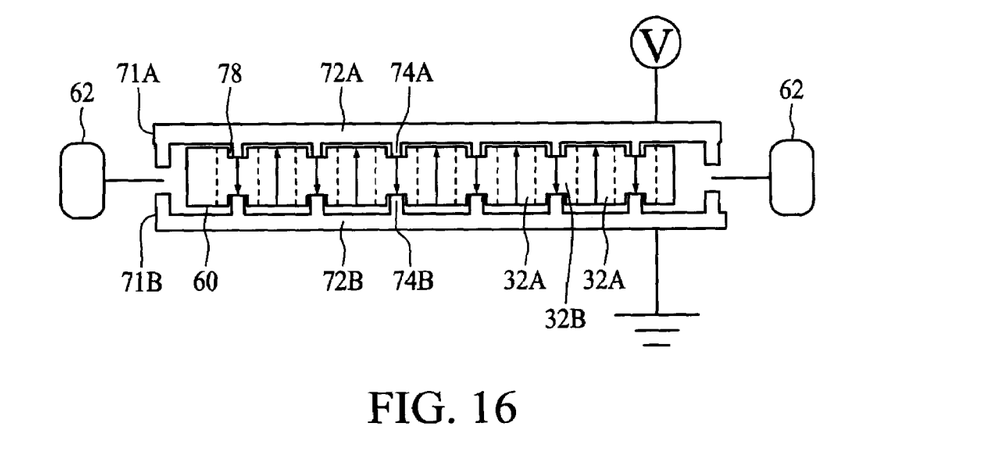

FIG. 15 and FIG. 16 illustrate a method for preparing a periodic poling structure 60 according to a third embodiment of the present invention. The processes shown in FIG. 1 to FIG. 7 are performed first, and a predetermined voltage is applied to the ferroelectric substrate 12 via an electrode element 70 including a top electrode 71A and a bottom electrode 71B to complete the periodic poling structure 60. The top electrode 71A includes a first conductive body 72A and a plurality of first conductive protrusions 74A positioned on the first conductive body 72A, and the bottom electrode 71B includes a second conductive body 72B and a plurality of second conductive protrusions 74B positioned on the second conductive body 72B, wherein the first conductive protrusions 74A are arranged in correspondence to the tunnels 28A in the ferroelectric substrate 12 and the second conductive protrusions 74B are arranged in mirror image of the first conductive protrusions 74A.

Preferably, the widths of the first conductive protrusions 74A and the second conductive protrusions 74B are smaller than those of the tunnels 28A and 28B, and each first conductive protrusion 74A is separated from the sidewall of the tunnel 28A by insulation gaps 78. Particularly, the widths of the first conductive protrusions 74A are equal and the first conductive protrusions 74A are separated equally, and the same is true for the second conductive protrusions 74B. In addition, vacuum pumps 62 can be used to pump free electrons and air to improve the contact between the electrode element 70 and the ferroelectric substrate 12.

The top electrode 71A and the bottom electrode 71B are moved such that the first conductive protrusions 74A are positioned to contact the base surfaces of the tunnels 28A in the ferroelectric substrate 12 and the second conductive protrusions 74B are positioned to contact the base surfaces of the tunnels 28B. Subsequently, the top electrode 71A is connected to the predetermined voltage and the bottom electrode 71B is grounded such that a plurality of first domains 32A having a first polarization direction are formed in the ferroelectric substrate 12 between the first conductive protrusions 74A and a plurality of second domains 32B interleaved between the first domains 32A are formed in the ferroelectric substrate 12. Furthermore, the method may further comprise a step of forming a plurality of conductive blocks 30', 46' in the tunnels 28A, and the first conductive protrusions 74A are positioned to contact the conductive blocks 30', 46' in the tunnels 28A.

Figure 17:
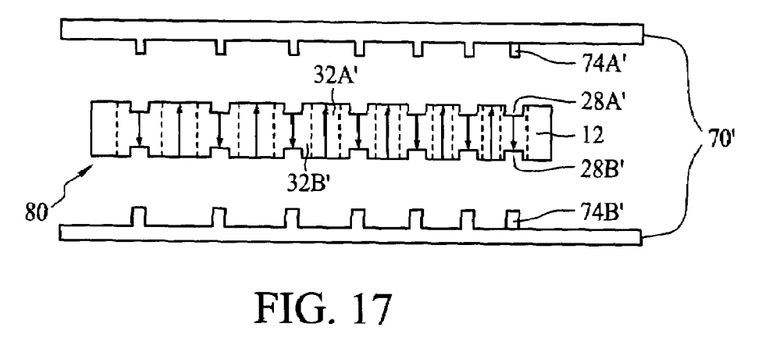
FIG. 17 illustrates a method for preparing a periodic poling structure according to a fourth embodiment of the present invention.

FIG. 17 illustrates a method for preparing a periodic poling structure 80 according to a fourth embodiment of the present invention. In comparison to the method in FIG. 15 using the electrode element 70 having equal-spaced conductive protrusions 74A and 74B in contact with the equal-spaced tunnels 28A and 28B of the ferroelectric substrate 12, the method in FIG. 17 uses an electrode element 70' having inequally-spaced conductive protrusions 74A' and 74B' contacting the inequally-spaced tunnels 28A' and 28B' of the ferroelectric substrate 12. Consequently, the prepared periodic poling structure 80 possesses periodically poled domains 32A' and 32B' of different widths, which can be used as a chirping quasi-phase matching structure.

Figure 18:
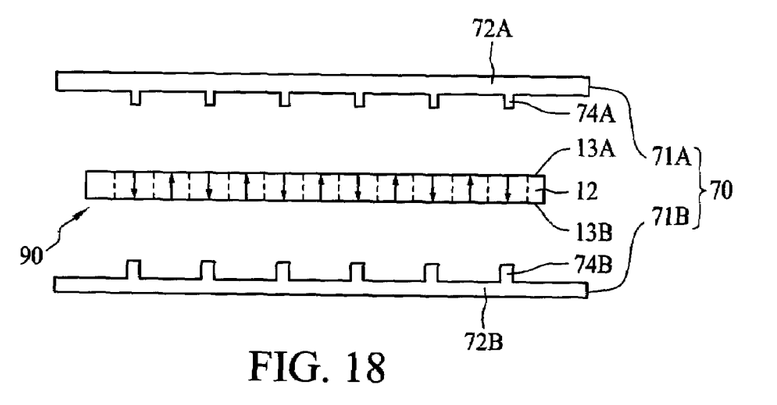
FIG. 18 illustrates a method for preparing a periodic poling structure according to a fifth embodiment of the present invention.

FIG. 18 illustrates a method for preparing a periodic poling structure 90 according to a fifth embodiment of the present invention. In comparison to the method in FIG. 15 which uses the conductive protrusions 74A and 74B of the electrode element 70 to contact the tunnels 28A and 28B of the ferroelectric substrate 12, the method in FIG. 18 uses the conductive protrusions 74A and 74B of the electrode element 70 to contact the top surface 13A and the bottom surface 13B of the ferroelectric substrate 12 without the tunnels 28A and 28B. After the predetermined voltage is applied to the top electrode 71A and the bottom electrode 71B is grounded, the ferroelectric substrate 12 possesses periodically poled domains 32A and 32B with alternating polarization direction.

Figure 19:
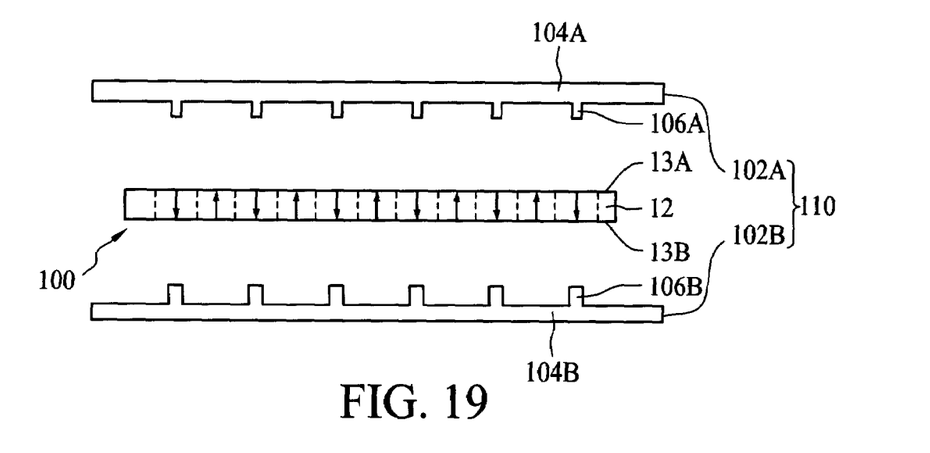
FIG. 19 illustrates a method for preparing a periodically poled structure according to a fifth embodiment of the present invention.
Figure 20:
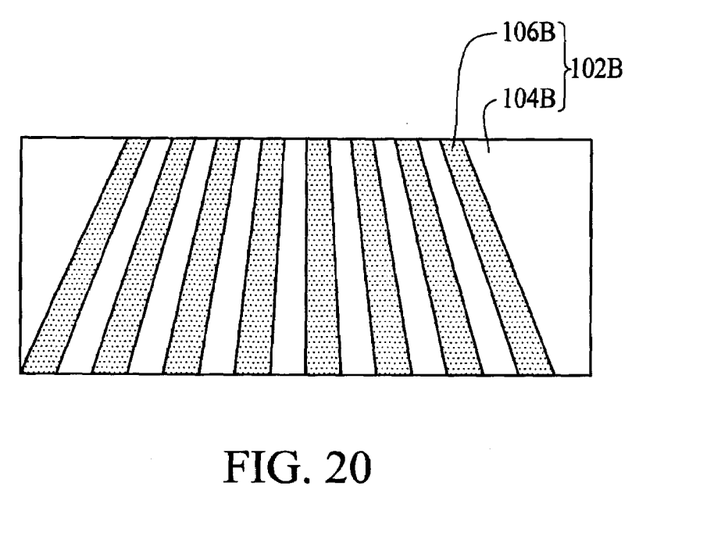
FIG. 20 is a top view of a bottom electrode.

FIG. 19 illustrates a method for preparing a periodic poling structure 100 according to a fifth embodiment of the present invention, and FIG. 20 is a top view of a bottom electrode 102B. In comparison to the above-described embodiments, the method in FIGS. 19 and 20 uses an electrode element 110 having a top electrode 102A and a bottom electrode 102B, and the bottom electrode 102B (the same to the top electrode 102A) includes a conductive body 104B and a fan-shaped conductive protrusions 106B positioned on the conductive body 104B. Consequently, the periodic poling structure 100, known as the fan-out quasi-phase matching structure, can be prepared by the electrode element 110 with the fan-shaped conductive protrusions 106A and 106B.

The above-described embodiments of the present invention are intended to be illustrative only. Numerous alternative embodiments may be devised by those skilled in the art without departing from the scope of the following claims.

What is claimed is:

1. A method for preparing a periodic poling structure, comprising the steps of:
    forming a plurality of tunnels in a ferroelectric substrate;
    forming a plurality of conductive blocks in the tunnels; and
    applying a predetermined voltage to the conductive blocks in the tunnels such that a plurality of first domains having a first polarization direction are formed in the ferroelectric substrate between the tunnels and a plurality of second domains interleaved between the first domains are formed in the ferroelectric substrate, wherein the tunnels are formed on a top surface and on a bottom surface of the ferroelectric substrate.

2. A method for preparing a periodic poling structure, comprising the steps of:
    positioning an electrode element to contact a ferroelectric substrate, the electrode element including a first conductive body and a plurality of first conductive protrusions positioned on the first conductive body; and
    applying a predetermined voltage to the electrode element such that a plurality of first domains having a first polarization direction are formed in the ferroelectric substrate between the first conductive protrusions and a plurality of second domains interleaved between the first domains are formed in the ferroelectric substrate.

3. The method for preparing a periodic poling structure of claim 2, further comprising a step of forming a plurality of tunnels in the ferroelectric substrate, and the first conductive protrusions being positioned into the tunnels in the ferroelectric substrate.

4. The apparatus for preparing a periodic poling structure of claim 3, wherein the widths of the first conductive protrusions are smaller than those of the tunnels in the ferroelectric substrate.

5. The apparatus for preparing a periodic poling structure of claim 3, wherein the first conductive protrusions are separated from the sidewalls of the tunnels by insulation gaps.

6. The method for preparing a periodic poling structure of claim 3, further comprising a step of forming a plurality of conductive blocks in the tunnels, and the first conductive protrusions being positioned to contact the conductive blocks in the tunnels.

7. The method for preparing a periodic poling structure of claim 6, wherein the step of forming a plurality of conductive blocks in the tunnels comprises:

depositing a conductive layer on a surface of the ferroelectric substrate; and removing a portion of the conductive layer from the surface of the ferroelectric substrate such that the conductive layer remaining in the tunnels forms the conductive blocks.

8. The method for preparing a periodic poling structure of claim 7, wherein the conductive layer remaining in the tunnels covers the base surfaces of the tunnels.

9. The method for preparing a periodic poling structure of claim 6, wherein the step of forming a plurality of conductive blocks in the tunnels comprises:

forming a photoresist layer having a plurality of openings exposing a portion of the ferroelectric substrate;

depositing a conductive layer covering the ferroelectric substrate and the photoresist layer; and removing a portion of the conductive layer covering the photoresists layer such that the conductive layer covering the ferroelectric substrate forms the conductive blocks in the tunnels.

10. The method for preparing a periodic poling structure of claim 9, wherein the openings in the photoresist layer expose a portion of the base surfaces of the tunnels.

11. The method for preparing a periodic poling structure of claim 10, wherein the openings are separated from the sidewalls of the tunnels by the photoresist layer.

12. The method for preparing a periodic poling structure of claim 3, wherein the tunnels are formed on a top surface and on a bottom surface is of the ferroelectric substrate.

* * * * *